US009747285B1

(12) United States Patent
Laufer

(10) Patent No.: US 9,747,285 B1
(45) Date of Patent: Aug. 29, 2017

(54) GEOLOCATION SYSTEMS AND METHODS FOR SEARCHING FOR ENTERTAINMENT EVENTS

(76) Inventor: Adam Laufer, Miami Beach, FL (US)

( * ) Notice: Subject to any disclaimer, the term of this patent is extended or adjusted under 35 U.S.C. 154(b) by 479 days.

(21) Appl. No.: 13/530,023

(22) Filed: Jun. 21, 2012

Related U.S. Application Data

(60) Provisional application No. 61/500,603, filed on Jun. 23, 2011, provisional application No. 61/512,853, filed on Jul. 28, 2011.

(51) Int. Cl.
*G06F 7/00* (2006.01)
*G06F 17/00* (2006.01)
*G06F 17/30* (2006.01)

(52) U.S. Cl.
CPC .................................. *G06F 17/30* (2013.01)

(58) Field of Classification Search
CPC ......... G06F 17/30749; G06F 17/30761; G06F 17/3087; G06F 17/3089; G06F 17/30899; G06F 17/30241
USPC ................................. 705/14.2, 14.4; 709/238
See application file for complete search history.

(56) References Cited

U.S. PATENT DOCUMENTS

| | | | | |
|---|---|---|---|---|
| 8,583,668 | B2* | 11/2013 | Higgins et al. | 707/758 |
| 2002/0049742 | A1* | 4/2002 | Chan | G06F 17/3087 |
| 2002/0156917 | A1* | 10/2002 | Nye | 709/238 |
| 2008/0086356 | A1* | 4/2008 | Glassman et al. | 705/10 |
| 2008/0133342 | A1* | 6/2008 | Criou et al. | 705/14 |
| 2010/0004995 | A1* | 1/2010 | Hickman | 705/14.58 |
| 2010/0076994 | A1* | 3/2010 | Soroca et al. | 707/769 |
| 2012/0123867 | A1* | 5/2012 | Hannan | 705/14.58 |
| 2013/0155181 | A1* | 6/2013 | Williams et al. | 348/36 |
| 2013/0311511 | A1* | 11/2013 | Peng | G06F 17/30241 |
| | | | | 707/769 |

OTHER PUBLICATIONS

Foursquare. Website homepage. Phone App. https://foursquare.com/. Accessed Sep. 26, 2012.
Smith. This Awesome Music App Helps You Get Out and Hear New Bands. Business Insider. Sep. 13, 2012. http://www.businessinsider.com/timbre-music-discovery-app-2012-9?op=1.

\* cited by examiner

*Primary Examiner* — Susan Chen
(74) *Attorney, Agent, or Firm* — Wilson Sonsini Goodrich & Rosati

(57) ABSTRACT

A computer-implemented method for presenting an entertainment requester with a selection of entertainment events comprises determining a geographic location of the entertainment requester and conducting, with the aid of a processor, a search for at least one entertainment event within a search area encompassing in whole or in part the geographic location of the entertainment requester. A geographic location of one or more entertainment events revealed upon the search is then displayed to the user on a graphical user interface (GUI) of an electronic device of the entertainment requester. The entertainment requester may then check into an entertainment event selected from the one or more entertainment events.

22 Claims, 15 Drawing Sheets

100

```
┌─────────────────────────────────┐
│ Receive a request from an       │
│ entertainment requester to      │─── 105
│ search for entertainment        │
│ events at or in proximity to a  │
│ geographic location of the      │
│ entertainment requester         │
└─────────────────────────────────┘
              │
              ▼
┌─────────────────────────────────┐
│ Determine the geographic        │─── 110
│ location of the entertainment   │
│ requester                       │
└─────────────────────────────────┘
              │
              ▼
┌─────────────────────────────────┐
│ Conduct a search for one or     │
│ more entertainment events       │─── 115
│ within a search area            │
│ encompassing in whole or in     │
│ part the geographic location    │
└─────────────────────────────────┘
              │
              ▼
┌─────────────────────────────────┐
│ Display a geographic location   │
│ of one or more entertainment    │─── 120
│ events revealed upon the        │
│ search                          │
└─────────────────────────────────┘
```

*FIG. 1*

GEOLOCATION SYSTEMS AND METHODS FOR SEARCHING FOR ENTERTAINMENT EVENTS

CROSS-REFERENCE

This application claims priority to U.S. Provisional Patent Application Ser. No. 61/500,603, filed Jun. 23, 2011, and U.S. Provisional Patent Application Ser. No. 61/512,853, filed Jul. 28, 2011, which applications are entirely incorporated herein by reference.

BACKGROUND

Music performers ordinarily perform for music fans. Such performances can be held at venues, such as music halls or open spaces that are adapted to accommodate the music performers and the music fans. Music fans may find such performances using advertisements or other notices, such as flyers. In some situations, a music fan searches for a musical performance by looking at a publication or an advertisement. For example, a music fan may peruse a local newspaper for any performances that may be of interest to the music fan. Such an approach, however, can be time consuming, as a music fan may have to review numerous publications for information that may be relevant in their search for an entertainment event.

SUMMARY OF INVENTION

Recognized herein are various limitations associated with current methods for finding music performances, or more generally entertainment events. Apart from the time intensive nature of perusing publications for advertisements or notices, current methods do not readily enable a user to search for and find entertainment events that are in proximity to the user.

The disclosure provides systems and methods for enabling a user, such as an entertainment requester, to search for and find entertainment events within a given geographic location ("geolocation"). Systems and methods provided herein can enable a user to search for entertainment events (e.g., music performances) that are in proximity to the user, or at or near a designated geographic location. The results of the search can be provided on a user interface, such as a graphical user interface (GUI), of an electronic device of the user. Systems provided herein provide various features that enable the user to interact with an entertainment provider or venue at which an entertainment event is provided.

An entertainment event may not be tied to a specific (or dedicated) venue. Systems of the disclosure provide entertainment requesters the capability to find events that may not be at a dedicated venue, and entertainment provides the capability to announce events and accept requester check-ins, in some cases without having a dedicated venue for the event.

The disclosure provides systems and methods that enable a user to maintain an electronic reminder or connection with an entertainment event. Such an electronic reminder may be tied to an experiential element associated with an entertainment event. In some examples, a user maintains a reminder or connection with an entertainment event by electronically checking into the event. Such an entertainment event check-in can provide an experiential tie to an event that may be different from a venue check-in.

An aspect of the invention provides a computer-implemented method for presenting an entertainment requester with a selection of entertainment events. The method comprises (a) determining a geographic location of the entertainment requester; (b) conducting, with the aid of a processor, a search for at least one entertainment event within a search area encompassing in whole or in part the geographic location of the entertainment requester determined in (a); and (c) displaying, on a graphical user interface (GUI) of an electronic device of the entertainment requester, a geographic location of one or more entertainment events revealed upon the search in (b).

Another aspect of the invention provides a computer-implemented method for receiving a check-in request for an entertainment event. The method comprises (a) receiving, with the aid of a system having a processor programmed to receive entertainment event check-in requests, a request from a user for a check-in at an entertainment event, wherein the entertainment event is provided by an entertainment provider at a venue, and wherein the request is provided by a geographic location device of the user; and (b) recording the request in a memory location of the system.

Another aspect of the invention provides a computer-implemented method for providing a location of an entertainment event. The method comprises (a) receiving, with the aid of a processor, an entertainment notification about an entertainment event of an entertainment provider provided at a venue at a designated geographic location, the entertainment notification having information that includes the designated geographic location; (b) recording the notification in a memory location coupled to the processor, the memory location adapted to record entertainment notifications having information of or related to entertainment events provided by entertainments providers at designated geographic locations, the designated geographic locations associated with the entertainment events; and (c) providing, from the memory location of (b), the designated geographic location of (a) for display on an electronic device of an entertainment requester in proximity to the geographic location.

Another aspect of the invention provides a system, comprising a processor a memory location coupled to the processor, the memory location having machine executable commands which, when executed by the processor, implement the methods above or provided elsewhere herein, alone or in combination. The processor retrieves the machine executable commands from the memory location and executes the machine-executable commands to provide a location of an entertainment event for display to a user.

Another aspect of the invention provides a system for gathering (or collecting) user electronic check-in data, comprising (a) one or more processors that execute machine readable code that implements a method comprising (i) receiving electronic check-in requests for entertainment events, wherein a given electronic check-in request is directed to a given entertainment event of an entertainment provider, wherein the given electronic check-in request is provided by a geographic location device of a user; and (ii) accepting the given electronic check-in request if one or more check-in criteria are met. The system further comprises a memory location coupled to the one or more processors, wherein the memory location stores the check-in requests.

Another aspect of the invention provides a computer-implemented method for directing advertising to an entertainment requester. The method comprises (a) determining a geographic location of the entertainment requester; (b) conducting, with the aid of a processor, a search for at least one entertainment event within a search area encompassing in whole or in part the geographic location; (c) displaying, on a graphical user interface (GUI) of an electronic device of the entertainment requester, a geographic location of one or more entertainment events revealed upon the search in (b); and (d) displaying an advertisement on the GUI.

Another aspect of the invention provides a computer readable medium comprising code that, when executed by one or more computer processors, implements a method, the method comprising: (a) determining a geographic location of the entertainment requester; (b) conducting, with the aid of a processor, a search for at least one entertainment event within a search area encompassing in whole or in part the geographic location of the entertainment requester determined in (a); and (c) displaying, on a graphical user interface (GUI) of an electronic device of the entertainment requester, a geographic location of one or more entertainment events revealed upon the search in (b).

Another aspect of the invention provides a computer readable medium comprising code that, when executed by one or more computer processors, implements a method, the method comprising: (a) receiving, with the aid of a system configured to receive entertainment event check-in requests, a request from a user for a check-in at an entertainment event, wherein the entertainment event is provided by an entertainment provider at a venue, and wherein the request is provided by a geographic location device of the user; and (b) recording the request in a memory location of the system.

Another aspect of the invention provides a computer readable medium comprising code that, when executed by one or more computer processors, implements a method, the method comprising: (a) receiving, with the aid of a processor, an entertainment notification about an entertainment event of an entertainment provider provided at a venue at a designated geographic location, the entertainment notification having information that includes the designated geographic location; (b) recording the notification in a memory location coupled to the processor, the memory location adapted to record entertainment notifications having information of or related to entertainment events provided by entertainments providers at designated geographic locations, the designated geographic locations associated with the entertainment events; and (c) providing, from the memory location of (b), the designated geographic location of (a) for display on an electronic device of an entertainment requester in proximity to the geographic location.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." or "FIGs." herein) of which:

FIG. 1 schematically illustrates a method for searching for entertainment events, in accordance with an embodiment of the invention;

DETAILED DESCRIPTION OF INVENTION

Figure 2:
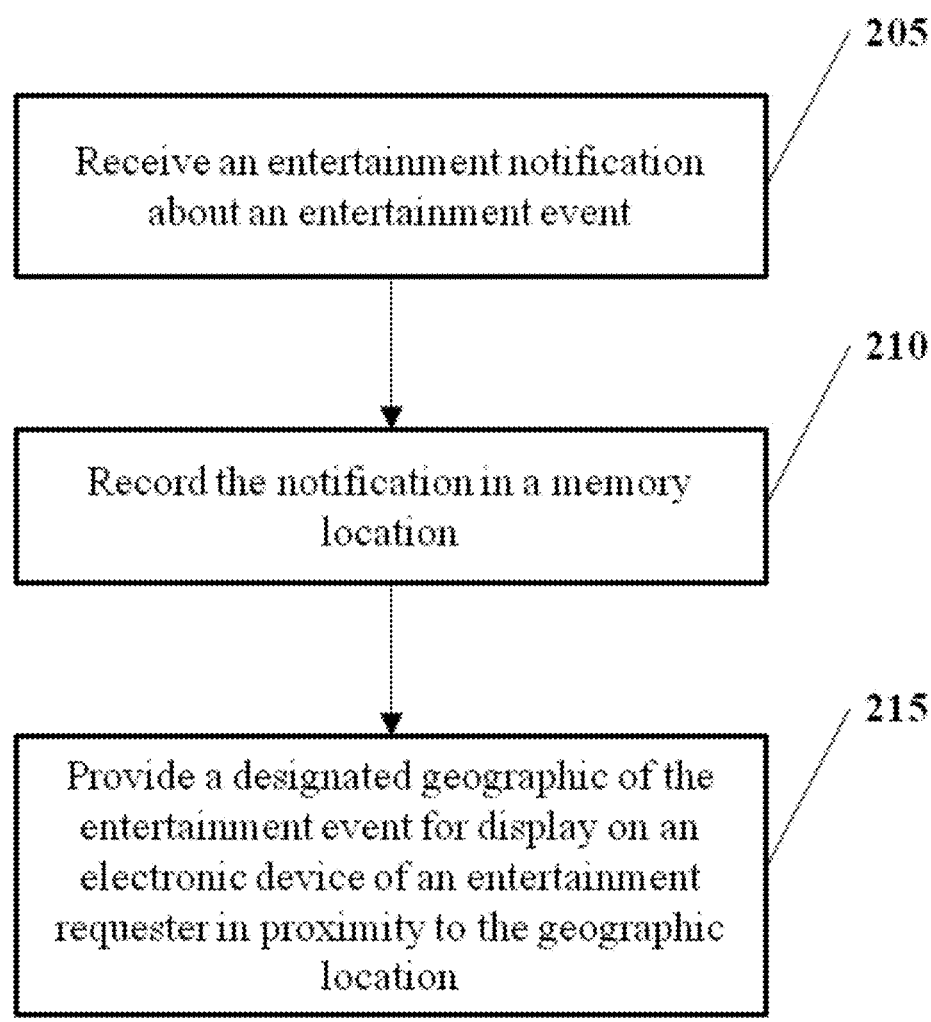
FIG. 2 schematically illustrates a method for receiving an electronic notification related to an entertainment event, in accordance with an embodiment of the invention.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed in practicing the invention.

The term "geographic location" (also "geo-location" and "geolocation" herein), as used herein, generally refers to the geographic location of an object, such as a user (e.g., entertainment requester). A geolocation may be identified by any device, system or method for determining or approximating the location of the object. In some embodiments, the geolocation of a user can be determined or approximated using the geolocation of an object associated with the user, which may be determined with the aid of an electronic device attached to or in proximity to the user. The geolocation of a user or venue can be determined with the aid of a geolocation device, which may be a portable electronic device (e.g., Apple® iPhone®, Android® enabled device). In some cases, the geolocation of an object can be determined using the manner in which a mobile device associated with the object communicates with a node. The geolocation of an object can be determined using node (e.g., wireless node, WiFi node, cellular tower node) triangulation. For example, the geolocation of a user can be determined by assessing the proximity of the user to a WiFi hotspot or one or more wireless routers. In another embodiment, the geolocation of an object can be determined using a geolocation device that includes a global positioning system ("GPS"), such a GPS subsystem (or module) associated with a mobile device (e.g., GPS capabilities of an Apple® iPhone® or Droid® based system).

The term "entertainment event," as used herein, generally refers to an event, such as a performance, of entertainment value or social interest to an individual experiencing the event. Examples of entertainment events include, without limitation, music (or musical) performances, movies, plays, comedy shows, television shows and theatrical performances. In some embodiments, an entertainment event is a musical performance, such as a music concert or a disc jockey (DJ) performing at a night-club. An entertainment event can be a live event or a pre-recorded event.

The term "venue," as used herein, generally refers to the location at which an entertainment event is hosted, displayed, or otherwise performed. A venue can be a music hall, stadium, bar, night club, school, restaurant, club, designated public or private location (e.g., park), or other location at which an entertainment event can be performed.

The term "entertainment provider" (also "provider" herein), as used herein, generally refers to one or more individuals or entities that perform or otherwise provide an entertainment event. Examples of entertainment providers include musicians, DJs, actors, or an organization implements the entertainment event, such as a company that projects a movie.

The term "entertainment requester" (also "requester" herein), as used herein, generally refers to an individual that is in search of, presently attending, or has attended an entertainment event. An entertainment requester may wish to search for entertainment events but may ultimately not attend any entertainment event revealed in the search. In an example, an entertainment requester is a music fan.

The term "user," as used herein, generally refers to an individual that uses, has used, or intends to use systems of the disclosure. A user in some cases is experiencing, intends to experience, or has experienced an entertainment event. A user can be an entertainment requester, entertainment provider, or a venue. For example, a user can be a music fan. In another example, a user is a performer.

The term "check-in," as used herein, generally refers to an electronic check in at an entertainment event. A check-in may be indicative of a user's intent to attend an entertainment event. A check-in may be conducted prior to a user attending an event, while the user is at the event, or, in some cases, after the user has left the event. A user that has checked into an event may attend the event.

Systems of the disclosure enable an entertainment requester to check into an entertainment event selected from one or more entertainment events. The one or more entertainment events may be revealed to the requester upon a search directed to a designated geographic location, which may be a location within a search area that encompasses in whole, or in part, a geographic location of the requester. In some embodiments, a requester checks into an event as opposed to a venue. This may advantageously permit an event to be provided at locations that are not tied to specific venues. For example, an event can be provided at a park or other public location.

In some examples, checking in to an event allows a music fan to connect with a performer(s) as opposed to connecting with an inanimate physical location or business that operates out of that location. For example, there may be a bar that a user would not ordinarily visit, but the user may visit the bar if a performer the user likes is performing at the bar. The user can then choose to follow that performer to receive notices of future performances, and other interactions that are enabled through the platform, both by and between the fan and performer and by and between multiple fans who are mutually interested in, or fans of, the performer. This may be advantageous in cases in which music fans have a stronger emotional connection to a musical event and the performers performing than they do towards a physical location (venue) where a performer is performing and a performance is taking place.

An event has a beginning time point and an end time point. In some embodiments, a user is checking in to the event and not the venue. Once the event ends, check-ins may no longer be relevant because users are checking into the fact that they attended an event not that they visited a given venue. The system can maintain a physical record of check-ins.

An event can draw people together that have a common interest in a given type of music or entertainment. Check-in's can provide users (e.g., entertainment event requesters, entertainment event providers and venues) various benefits. In some examples, check-in's can provide an experiential element to an event that does not exist relative to a venue that a user may want to participate in or contribute to, such as by uploading photos or sharing comments. In some embodiments, check-in's facilitate social interactions by and between users who are already at a common event and have an entertainment preference in common and may have a continual interest in interacting through the platform or otherwise, we are a social network based on mutual interests.

Methods for Searching for Entertainment Events

An aspect of the invention provides a computer-implemented method for presenting a entertainment requester with a selection of entertainment events. The method can be facilitated with the aid of a system that includes machine-executable code for implementing the method (see below). The method comprises receiving a request from an entertainment requester for one or more entertainment events at or in proximity to a geographic location of the entertainment requester. Next, the geographic location of the entertainment requester is determined, and the system conducts, with the aid of a processor of the system, a search for at least one entertainment event within a search area encompassing in whole or in part the geographic location of the entertainment requester. A geographic location of each of one or more entertainment events revealed upon the search is then displayed on a graphical user interface (GUI) of an electronic device of the entertainment requester. In some situations, the GUI includes a map, and the one or more entertainment events, including the entertainment requester's geolocation, can be displayed on the map. The geographic location of the entertainment requester can be determined with the aid of the electronic device of the entertainment requester, such as a portable electronic device.

As an alternative to providing entertainment events on a GUI of the entertainment requester, the system can transmit the entertainment requester a message, such as an instant message (IM), electronic mail ("email"), or short message service or multimedia message service text message (collectively, "text message" herein).

In some cases, a list of entertainment events is generated to reflect the one or more entertainment events revealed in the search. The list can be displayed on the GUI. The list may be sorted by one or more sorting criteria, such as, for example, a date and/or time of the entertainment event, or by the distance between the geolocation of the entertainment requester, music preference, number of users who a user is connected to, cost of the entertainment event and the location of the entertainment event. The list can be sorted in ascending or descending order, such as, for example, by events that are in closest proximity to the entertainment requester.

In some embodiments, the search area includes a search radius. In an example, the search area can be defined by a circle centered about the geolocation of the entertainment requester, with the circle having a radius that can define the search area (i.e., area=$\pi*r^2$). The search radius can be up to about 1,000 miles, 500 miles, 100 miles, 50 miles, 30 miles, 20 miles, 10 miles, 5 miles, 1 miles, or 0.5 miles. In some situations, the system can enable the entertainment requester to search multiple search areas concurrently or substantially simultaneously. For example, the entertainment requester can search a first city (e.g., Palo Alto) and a second city (e.g., San Francisco) at the same time.

In some embodiments, the search area is selected by the entertainment requester. The entertainment requester may select the search area by inputting a search radius (e.g., 5 miles) into a search radius field in a GUI of the electronic device of the entertainment requester.

In some embodiments, the at least one entertainment event is of one or more types selected by the entertainment requester. For example, the entertainment requester may wish to view musical performances within a search area, or view musical performances and theatrical performances within the search area.

In some cases, upon the search for entertainment events, the results of the search may be filtered by various filtering criteria, such as, for example, the distance of an entertainment event to the entertainment requester and the type of entertainment event desired by the entertainment requester.

In some embodiments, the method further comprises receiving a request from the entertainment requester to request a check-in at a given entertainment event that is selected by the entertainment requester from the one or more entertainment events displayed on the GUI. Alternatively, the entertainment requester can check into the venue at which the event is located. Upon the check-in, the system can direct a notification to an entertainment provider, provider, organizer or venue having the entertainment event, which notification indicates the entertainment requester check-in. For example, the system can direct a notification to an entertainment provider indicating that the entertainment requester has checked in. In another example, the system can direct a notification to a venue having the entertainment event indicating that the entertainment requester has checked in.

In some embodiments, a user can check into an event only if the entertainment requester is within a certain distance from a venue at which the event is located. For instance, a user can check into an event if the entertainment requester is within 30 miles, 20 miles, 10 miles, 9 miles, 8 miles, 7 miles, 6 miles, 5 miles, 4 miles, 3 miles, 2 miles, 1 mile, 0.5 miles, 0.1 miles, directly adjacent to the venue or at the venue itself where the entertainment event is taking place.

In some embodiments, upon receiving a check-in request to an entertainment event or venue from a user, the system can determine if the entertainment requester is checked into another entertainment event or venue. If the system determines that the entertainment requester is checked into another event, the system can provide the entertainment requester the opportunity to check out of the other event or select which event to remain checked into. In some situations, the system can check out a user from an event if the system determines that the event has terminated or the entertainment requester has checked into another event and is located at the venue of the other event. The location of the entertainment requester in such a case can be determined with the aid of the geolocation device of the entertainment requester.

In some embodiments, the ability of a user to check into multiple events is governed by event provider or venue check-in preferences. For instance, a venue may only wish a user to check into that venue and not other venues. In such a case, the system may only permit a user to check into an event if the entertainment requester is not checked into another event. In some cases, upon checking into another event or venue, the system will check the entertainment requester out of a previous event or venue.

In some cases, indentifying information associated with one or more other users is displayed on the GUI. The one or more other users can be located at a given entertainment event selected from the one or more entertainment events displayed on the GUI. For example, the entertainment requester can select to check-in and attend a given music event selected from a list of music events in proximity to a geolocation of the entertainment requester, and the system can provide the entertainment requester a list of one or more other users that are planning on attending the music event or presently at the music event. The system can then permit the entertainment requester to contact the one or more other users, such as by way of a text message (e.g., short message service or multimedia message service text message), an instant message, an electronic mail (email) or a phone call. Alternatively, the system can permit the entertainment requester to tap another user, which puts the other user on notice that the entertainment requester wishes to communicate with the other user. The system can also permit users to purchase and/or send virtual gifts to one another. The system can permit a user to provide a monetary gratuity to a performer.

FIG. 1 schematically illustrates a method 100 for enabling a user to search for entertainment events, in accordance with an embodiment of the invention. In a first step 105, the system receives a request from the entertainment requester to search for entertainment events at or in proximity to a geographic location of the entertainment requester. Next, in a second step 110, the geographic location of the entertainment requester is determined. In a third step 115, the system conducts a search for one or more entertainment events within a search area encompassing in whole or in part the geographic location of the entertainment requester. Next, in a fourth step 120, a geographic location of one or more entertainment events revealed upon the search is displayed to the entertainment requester, such as on a graphical user interface of the electronic device of the entertainment requester.

In some cases, the method 100 can be used to enable the entertainment requester to search for entertainment events with a designated geographic location, which may be in proximity to a geographic location of the entertainment requester or situated remotely in relation to the geographic location of the entertainment requester. In an example, a user in Miami, Fla. can search for entertainment events in the South of Market (SOMA) district of San Francisco, Calif.

Methods for Checking into Entertainment Events or Venues

Another aspect of the invention provides a computer-implemented method for receiving a user check-in request. Such a check-in request can be provided by a user that wishes to attend an entertainment event or a venue in which the entertainment event is provided. The method comprises receiving a request for a check-in at the entertainment event or the venue. In some embodiments, the request is for a check-in at the entertainment event. The request is received by a system that has a processor programmed to receive entertainment event and/or venue electronic check-in ("check-in") requests. The entertainment event can be at or in proximity to the venue. The request can be provided by an electronic device of a user that is in communication with the system, such as, for example, a geolocation device of the user. The request is recorded in a memory location of the system. A check-in can be requested by entertainment requesters, entertainment providers and venues.

A check-in can be associated with a present or future intent to attend a given entertainment event. In some cases, a user (e.g., entertainment requester) performs a check-in while the user is at the entertainment event or moments before attending the entertainment event. In other cases, the user performs a check-in some time before the user attends the entertainment event, such as up to 1 minute, 2 minutes, 3 minutes, 4 minutes, 5 minutes, 10 minutes, 20 minutes, 30 minutes, 1 hour, 2 hours, 3 hours, 4 hours, 5 hours, 6 hours, 12 hours, 1 day, 2 days, 3 days, 4 days, 5 days, 6 days, 1 week, 2 weeks, 3 weeks, 1 month, 12 months, 1 year or more before attending the event. In some situations, the user can perform a check-in even after attending the event. In an example, the user attends an entertainment events but does not perform a check-in prior to or during the event, but performs a check-in while leaving the event.

In some cases, the point in time at which a user can perform a check-in can be selected by the entertainment event provider or the venue. A provider may only permit a check-in during a time period before which an event is set to begin.

Entertainment event providers and venues can make check-in requests. In some embodiments, the system is programmed to receive a check-in request for a check-in at a venue and a separate check-in request for a check-in at an entertainment event at the venue.

In some situations, prior to the system recording the request in the memory location of the system, the system determines whether one or more check-in criteria are met. The one or more check-in criteria can be, for example, the distance of the user from the event, the distance of the user from the venue, timestamp associated with a last check-in, entertainment event check-in criteria, entertainment provider check-in criteria and/or venue check-in criteria. If the one or more check-in criteria are met, the system can accept the check-in from the user.

In some embodiments, a user may conduct a check-in to an entertainment event without having to request a check-in. In such a case, the system may not determine whether one or more check-in criteria are met. The user can be checked into the event regardless of whether the one or more check-in criteria are met.

In some situations, the system can accept the request for the check-in if the user is within a request distance from the venue. The request distance, in some cases, is up to about 1000 miles, 500 miles, 100 miles, 50 miles, 40 miles, 30 miles, 20 miles, 10 miles, 5 miles, 4 miles, 3 miles, 2 miles, 1 mile, or 0.5 miles.

In some embodiments, the system notifies the user if the user's check-in is accepted or denied. A check-in can be declined, for example, if one or more check-in criteria are not met.

A check-in can provide various features and functionalities to entertainment event providers and venues at which entertainment events are provided. A check-in can enable an entertainment provider or venue to track the number of users that intend to attend, are presently attending, or have attended an entertainment event of the provider. In some cases, a check-in can enable the provider or venue to determine identifying information associated with a user, such as the user's age, sex, marital status, address, likes and dislikes, work information, hobbies and educational information.

In some embodiments, users that have checked into an event or venue can be provided various benefits or functionalities at the event or venue. In some cases, users (e.g., entertainment requesters) that have checked into an event can be provided the opportunity to communicate with one another, such as, for example, by way of instant messaging, email, text message or taps. Users that have checked into a venue at which an entertainment event is provided can be provided food and/or drink discounts, or select menu items that are only available to users that have checked into the venue.

The system can be programmed to provide various statistical data from check-in requests. For instance, from entertainment event check-in requests the system can determine the fraction or percentage of users (e.g., music fans) that have interest in a particular type of entertainment event within a given geographic location. In some situations, based on check-in data at an event or based on averages aggregated from a performer that are collected by the system at several performances, or based on a cross-section of performances, the system can measure and/or identify the length of stay at a given event or venue, or the number of connections by and between users attending the event and estimating or calculating the likelihood that they know each other. The system can determine whether users are local or from remote geographic locations, such as other cities.

The system can determine the distance that any given user travels to attend an entertainment event. In addition to the number of performers available to perform in a given area, the system can determine the average age of followers of a given performer; whether users are willing to pay a cover charge and/or food or drink minimum to see a performer, and the threshold amount that a user is willing to apply towards a cover charge; the number of followers a performer has; and the number of check-in's per event, area or geographic location. The system can determine an average over a certain range of events, ages of users who follow a performer and/or check-in to an event, the number of gratuities that are provided, the total gratuities provided, and the average amount of the gratuities. The system can determine and provide the number of ratings (e.g., star ratings) assigned to a performer's performance by the user.

Systems provided herein can be used to rank fans. A fan can be ranked based on certain interactions between the fan and the entertainment provider (or performer). In some examples, a fan is ranked based on number of shows attended or checked into, the number of product (e.g., music) purchases though the system, gratuities paid to an entertainment event provider, and/or other commercial interactions.

Systems provided herein can provide users the capability to create and update event-based photo albums. In some examples, a user can create an event based photo album (e.g., a photo album dedicated to a music concert).

Some embodiments provide systems and methods for collecting, storing, and aggregating check-in and follower data and other data points collected and/or mined, which can be searched or otherwise used by promoters or venues to hire ("book") entertainment providers for performances ("gigs"). Such systems can provide venues (or promoters) data that may be used to more effectively identify and select entertainment providers for performances. In some cases, machine learning technology (e.g., systems, algorithms) can analyze the size of markets in which entertainment event providers perform, as well as the number of followers they have, the number of check-ins, physical capacity of the venue and other data elements, and generate a performance fee scale that promoters and entertainment event providers can use in establishing and/or negotiating compensation an entertainment event provider should receive for providing a performance. Entertainment providers can use such data to solicit and/or negotiate performance opportunities with promoters and/or venues.

Some embodiments provide a system that collects and aggregates data, such as user check-in data and requester and/or provider notification data on performances. Such data can be provided to requesters, providers and venues for a fee collected by the system.

Entertainment Event Notifications

Another aspect of the invention provides a computer-implemented method for providing a location of an entertainment event. The method comprises receiving, with the aid of a processor of a system programmed to implement the method, an entertainment notification about an entertainment event of an entertainment provider that is or will be provided at a venue at a designated geographic location. The entertainment notification comprises information that includes the designated geographic location. Next, the notification is recorded in a memory location coupled to the processor. The memory location is adapted to record entertainment notifications having information of or related to entertainment events provided by entertainment providers at designated geographic locations, the designated geographic locations associated with the entertainment events. Next, the designated geographic location of the entertainment event is provided from the memory location for display on an electronic device of a user in proximity to the geographic location. The user can be an entertainment requester.

In some cases, the designated geographic location is designated by the entertainment provider. In an example, the entertainment provider is a music group that selects a park to play music. The venue in such a case can be the park.

In some embodiments, the designated geographic location is provided for display on a GUI of the electronic device of the user. The GUI can be provided for display upon the user conducting a search for one or more entertainment events, as described elsewhere herein.

In some embodiments, the entertainment notification is received by the system from an entertainment requester. Alternatively, the entertainment notification can be received from the entertainment provider and/or the venue. In an example, a music group performing at park directs a notification to the system about the date, time and location of the musical performance of the music group.

In some situations, the designated geographic location is at or in proximity to the geographic location of the user. In an example, an entertainment requester traveling through a local park becomes aware of a musical performance at the local park and provides a notification of the musical performance to the system. The given area in such a case is in proximity to the geographic location of the entertainment requester. The entertainment requester can attend the musical performance, or may elect to not attend the performance. Notwithstanding the entertainment requester attendance, the system is notified of the musical performance, and other entertainment requesters may search for, find and check into the musical performance.

In some situations, before the system records the notification in the memory location, the system determines whether one or more notification criteria are met. The one or more notification criteria can be one or more of distance of the user (e.g., entertainment requester) from the designated location, at least one criterion provided by the entertainment provider, at least one criterion provided by the venue.

FIG. 2 schematically illustrates a method 200 for receiving an entertainment notification, in accordance with an embodiment of the invention. The method 200 can be implemented with the aid of a system that is programmed to receive entertainment notifications and provide the locations of entertainment events. In a first step 205, the system receives an entertainment notification about an entertainment event (e.g., musical performance). The notification can be received from an entertainment requester (e.g., music fan), an entertainment provider (e.g., musician performing at the event), or a venue (e.g., a bar or music hall at which the entertainment event is to be performed). The notification can include information as to the entertainment event, such as a designated location of the event, the date and time of the event, the name of the event, the type of entertainment provided at the event, and/or details as to an entertainment provider that will provide the event. In some situations, the notification is received from a user, entertainment provider or venue, and the notification includes information on the designated location of the entertainment event. The designated location can be measured or calculated with the aid of a geolocation device of the user, entertainment provider or venue.

Next, in a second step 210, the notification is recorded in a memory location of the system. The memory location can be an electronic data storage system, such as a database. The notification recorded in the memory location can include details as to the designated geographic location of the entertainment event.

Next, in a third step 215, a designated geographic of the entertainment event is provided from the memory location for display on an electronic device of a user in proximity to the geographic location. The user can be an entertainment requester. The entertainment requester may select to request a check-in to the entertainment event.

In some embodiments, the memory location is populated with data that is relevant to entertainment events. The memory location can be populated using entertainment notifications received by the system from entertainment requesters, entertainment providers and/or venues.

Systems for Searching for Entertainment Events

Another aspect of the invention provides a system that can be programmed to implement any of the methods of the disclosure, such as, for example, providing a location of an entertainment event upon a search by a user for entertainment events. The system comprises at least one computer processor (also "processor" herein) and a memory location (also "computer memory" or "memory" herein) coupled to the processor. The memory includes machine executable commands which, when executed by the processor, implement any of the methods of the disclosure. In some embodiments, the processor retrieves the machine executable commands from the memory location and executes the machine-executable commands to provide a location of an entertainment event for display to a user.

Figure 3:
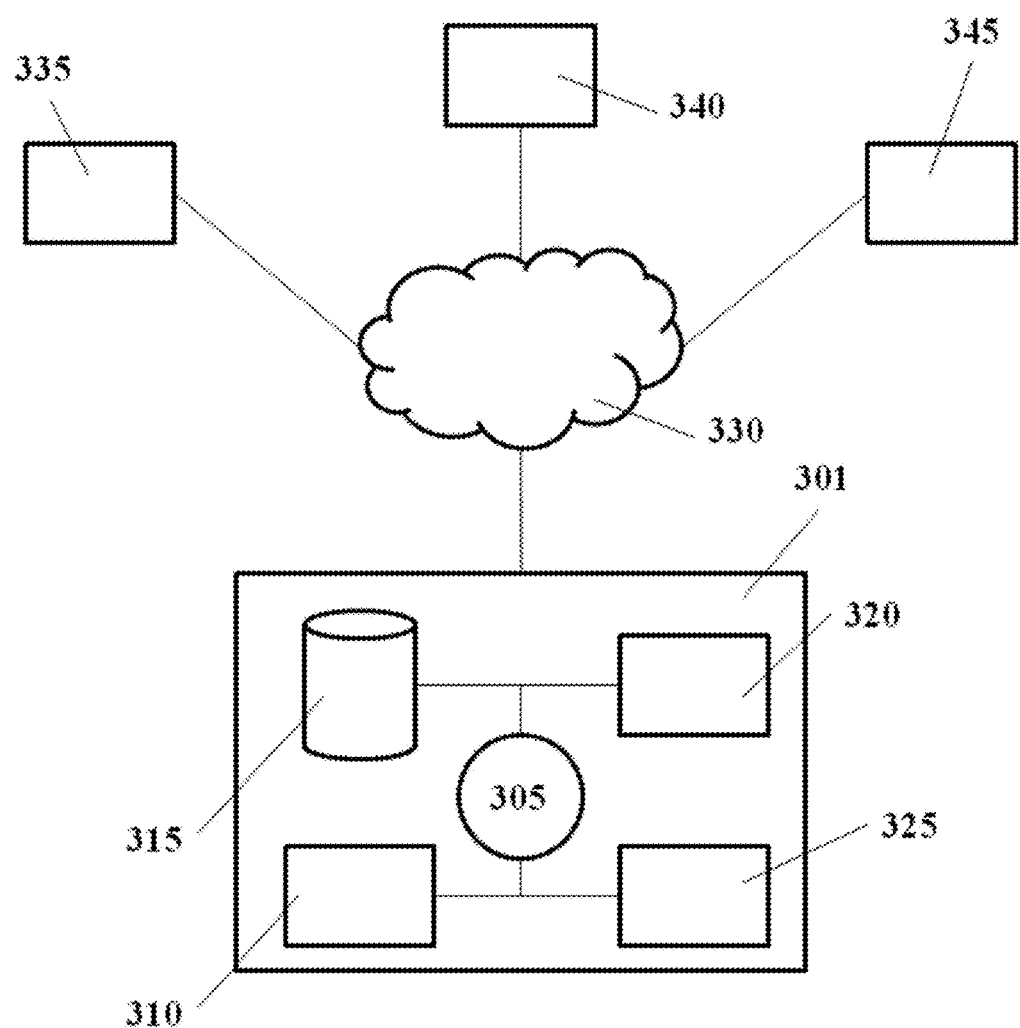
FIG. 3 schematically illustrates a system for generating a media queue, in accordance with an embodiment of the invention.

FIG. 3 shows a system 300 adapted to enable a user (e.g., entertainment requester) to find an entertainment event in proximity to a geolocation of the user, in accordance with an embodiment of the invention. The system 300 includes a central computer server ("server") 301 that is programmed to implement the methods of the invention. The server 301 includes a central processing unit (CPU, also "processor" herein) 305, which can be a single core or multi core processor, or a plurality of processors for parallel processing. The server 301 also includes memory 310 (e.g., RAM, ROM, flash memory), electronic storage unit 315 (e.g., hard disk), communications interface 320 (e.g., network adapter) for communicating with one or more other systems, and peripheral devices 325, such as cache, other memory, data storage and/or electronic display adapters. The memory 310, storage unit 315, interface 320 and peripheral devices 325 are in communication with the CPU 305 through a communications bus (solid lines), such as a motherboard. The storage unit 315 can be a data storage unit (or data repository) for storing data. The server 301 is operatively coupled to a computer network ("network") 330 with the aid of the communications interface 320. The network 330 can be the Internet, an internet and/or extranet, or an intranet and/or extranet that is in communication with the Internet. The network 330 can include one or more computer servers, which can enable distributed computing.

The storage unit 315 can store files, such as filed related to entertainment event notifications, user profiles and music files. The server 301 in some cases can include one or more additional data storage units that are external to the server 301, such as located on a remote server that is in communication with the server 301 through an intranet or the Internet. The storage unit 315 can store information related to check-in's, such as check-in requests, check-in history, declined check-in's, and accepted check-in's. Such information can include details as to uses (e.g., entertainment requesters) that requested the check-in's.

The server 301 can communicate with one or more remote computer systems through the network 330. In the illustrated example, the server 301 is in communication with a first computer system 335 and a second computer system 340 and a third computer system 345 that are located remotely with respect to the server 301. The first computer system 335, second computer system 340 and third computer system 345 can be, for example, personal computers (e.g., portable PC), slate or tablet PC's (e.g., Apple® iPad), telephones or Smart phones (e.g., Apple® iPhone, Android-enabled device, Blackberry® Windows® Phones).

In an example, the first computer system 335 is a portable electronic device of a user that desires to search for and find entertainment events at or in proximity to a geolocation of the user. The user can access the server 301 via the network 330 to request the search. The server 301 can conduct the search and transmit search results to the first computer system 335 of the user. The search results can be displayed on a graphical user interface of the first computer system 335.

In some situations the system 300 includes a single server 301. In other situations, the system 300 includes multiple servers in communication with one another through an intranet and/or the Internet.

Methods of the invention can be implemented by way of machine (or computer processor) executable code (or software, also "code" herein) stored on an electronic storage location of the server 301, such as, for example, on the memory 310 or electronic storage unit 315. During use, the code can be executed by the processor 305. In some cases, the code can be retrieved from the storage unit 315 and stored on the memory 310 for ready access by the processor 305. In some situations, the electronic storage unit 315 can be precluded, and machine-executable instructions are stored on memory 310.

The code can be pre-compiled and configured for use with a machine have a processor adapted to execute the code, or can be compiled during runtime. The code can be supplied in a programming language that can be selected to enable the code to execute in a pre-compiled or as-compiled fashion.

The server 301 can be adapted to store user profile information, such as, for example, a name, physical address, email address, telephone number, instant messaging (IM) handle, educational information, work information, social likes and/or dislikes, and other information of potential relevance to the user or other users. Such profile information can be stored on the storage unit 315 of the server 301.

Aspects of the systems and methods provided herein, such as the server 301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., ROM, RAM) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

In some cases, code that is executable by a single processor may be executed by a plurality of processors, such as in a parallel processor environment or distributed computing fashion. Code that is executable by a plurality of processors may be executed by a single processor.

In some cases, the server 301 can be configured for data mining, extract, transform and load (ETL), or spidering (including Web Spidering where the system fetches data from remote systems over a network and access an Application Programmer Interface or parses the resulting markup) operations, which may permit the system to load information from a raw data source (or mined data) into a data warehouse. The data warehouse may be configured for use with a business intelligence system (e.g., Microstrategy®, Business Objects®). The media file management system can include a data mining module adapted to search for media content in various source locations, such as email accounts and various network sources, such as social networking accounts (e.g., Facebook®, Foursquare®, Google+, Linkedin®, Twitter®, Instagram®) or on publisher sites, such as, for example, weblogs.

Entertainment events can be presented to a user with the aid of a user interface (UI), such as a graphical user interface (GUI), on an electronic device of the user. In some situations, a GUI can enable a user to access the results of a search for entertainment events at a designated geographic, and even perform various functions upon reviewing the results, such as checking into an entertainment event (also "check-in" herein).

The UI, such as GUI, can be provided on a display of an electronic device of the user that is adapted to measure (or calculate) a geolocation of the user. The display can be a capacitive or resistive touch display, or a head-mountable display (e.g., Google® Goggles). Such displays can be used with other systems and methods of the disclosure.

Targeted Advertising

Another aspect of the invention provides a computer-implemented method for directing advertising to an entertainment requester. The method comprises determining a geographic location of the entertainment requester. Next, with the aid of a processor, a search for at least one entertainment event within a search area encompassing in whole or in part the geographic location is performed. A geographic location of one or more entertainment events revealed upon the search is then displayed on a graphical user interface (GUI) of an electronic device of the entertainment requester. One or more advertisements are then displayed on the GUI.

In some situations, the one or more advertisements are displayed on the GUI upon the entertainment requester checking into a given entertainment event among the one or more entertainment events displayed in (c). In some cases, the entertainment requester requests to check into a given entertainment event selected from the one or more entertainment events displayed on the GUI. Upon receiving the request to check into the given entertainment event, the system may check the entertainment requester into the given entertainment event. The one or more advertisements may be displayed on the GUI upon checking the entertainment requester into the given entertainment event.

The one or more advertisements may be selected in view of (i) the type of entertain event of the given entertainment event, (ii) the proximity of the entertainment requester to a given entertainment event among the one or more entertainment events, (iii) the proximity of the entertainment requester to a venue of the given entertainment event, and/or (iii) one or more preferences of the user (e.g., entertainment requester, entertainment provider).

Such an approach may enable entertainment providers, such as performers, to provide entertainment requesters, such as music fans, advertising that may be directed at least in part to, for example, an entertainment requester's likes and/or preferences, proximity of the entertainment event to an entertainment event or venue having the entertainment event, the type of venue (e.g., bar, lounge, concert hall) having the entertainment event, type of entertainment event (e.g., musical performance, cinema), and/or user demographics (e.g., students).

Systems and methods of the disclosure can be configured to provide targeted advertisements ("ads") and/or promotions to users. In an example, the system 300 of FIG. 3 uses preferences, such as user likes and dislikes as to entertainment events (as may be assessed using check-in information, for example), and provide ads that are targeted to users based on their entertainment preferences. In addition, the system can provide a user one or more ads based on a particular entertainment event they are attending, proximity to the entertainment event, the venue at which the entertainment event is located, and/or any sponsors of the entertainment event. The system can access the user's profile and provide ads that, for example, are in-line with the user's preferences. For example, if the user is a sports fan and is attending a music event, the system can provide the user ads that are directed to sports teams, sport equipment, or games. For example, if the entertainment event is sponsored by a grocery store, the system can present the user, such as a user that has checked into the event, ads and/or promotions (e.g., discount coupons) that are related to the grocery store. In some embodiments, promoters, venues or performers can pay for their events to be featured and displayed first in rank order or more prominently on the displayed map, list view or through direct messaging and/or alerts to a group of users.

Exemplary Features

Systems provided here can be programmed to provide various exemplary features and functionalities.

Systems of the disclosure may provide entertainment requesters (e.g., music fans) the ability to search for and find entertainment events at a designated geographic location, such as an event that is in proximity to an entertainment requester ("requester"). In an example, a requester, such as a music fans, may follow performers and designate select performers as favorite performers. A requester may check into an event and interact with other requesters. The system permits a requester to follow a given entertainment provider and view other requesters that have checked into a given event. The system can permit a requester to earn badges, which may be provider-specific badges that can be customized by the provider. A provider or venue can offer rewards to requesters for attending a given event, such as discounts or special offers at the venue. A requester can tip a provider or venue using systems provided herein, such as with the aid of a virtual currency provided by the system, which can be redeemed for an item of monetary value, such as cash. A requester can select and send a virtual gift to a provider or another requester, such as, for example, a food or drink item, which may be redeemed at the venue. A requester may invite another potential requester to the event. A requester may view a listing of other requesters that have checked into an event. A requester may direct a message (e.g., instant message, text message, email, phone call, tap) to another requester.

In some embodiments, music fans can determine the presence or view information related to other music fans at a common event; they can send each other virtual gifts; they can message each other; they can "tap" each other. In some cases, music fans can broadcast their attendance and other actions through application program interfaces (APIs) to other social networks or platforms that the users are members of (i.e., a music fan may cause a notification that they have attended an event at a given location and/or that they "tapped" a certain person while attending a specific event to be published on their Facebook® timeline). In some cases, music fans can follow other music fans and can conversely be followed. When music fans follow and are followed by each other they can become friends on the platform and share more personal data and communicate in enhanced ways. In some situations, the system can recommend or suggest to music fans entertainment events that may be held in the future based on their past event attendance history. In some cases, the system, through an application, can analyze the media (e.g., music, video) files on the music fan's device and suggest music events based on a assessment of the music fan's music, as may be included in the music fan's music library. The platform may recommend that certain music fans connect, and/or follow, other music fans (or performers) who share similar musical interests, and who may have attended several of the same events in the past.

Systems of the disclosure provide entertainment providers (e.g., musicians, performers) the ability to interact with requesters and venues. The system can enable an entertainment provider ("provider") the ability to receive an item of value (or payment) from a requester, which item of value may be for attending the provider's event or gratuity for the event.

The system (also "platform" herein) can provide entertainment providers, such as performers, various capabilities. For example, 1) the platform provides a form of free advertising and/or promotion of upcoming performances which will serve i) existing fans and followers who may already be aware of the performer and be subscribed to alerts of performances and ii) enable new music fans to discover the performers' music and attend their performances; 2) the platform allows performers to capture data relative to the number of fans that attended their performance (check-ins); 3) the platform enables providers the ability to target specific users, such as targeting users to invite to events; 4) the platform enables fans to "follow" the performers, who then can opt to receive alerts of future performances; 5) check-ins and followers can be used to demonstrate a performer's popularity and fan base which can be used in negotiating performance rates/terms with venues; 6) performers can receive gratuities from fans in attendance at their performances; 7) the social interaction by and between fans enabled by the platform creates a more rich social experience and can enable higher enjoyment, which can result in fan retention and likelihood of continued attendance at future shows; 8) performers can offer for sale merchandise and/or music to the fans that follow them on the platform; 9) the platform allows performers to identify their best fans, as the platform will rank fans based on a variety of factors, including but not limited to, the number of performances attended (check-ins), gratuities paid, merchandise purchased, etc., and enables the performer to reward persons in kind, such as with discounts on merchandise, first option to purchase tickets for upcoming shows, private concerts, etc. (e.g., the platform offers a "fan club" type service for performers); 10) performers can use communication tools within the platform to communicate with their followers; 11) performers can use the platform to advertise their availability to venues to secure performances; 12) all performers who use the platform are included in a searchable pool of performers for venues to search based on certain metrics including check-ins followers, performance rates, type of music etc. and may receive booking requests from venues/ promoters for gigs; 13) the platform allows users to attach photos that were taken at the performance to an album connected to that performer and the specific performance, creating a visual record of the event; 14) performers receive ratings/reviews from event attendees; 15) event attendees can push though their other social media channels remarks, pictures or other items relating to the performer and performance which creates greater exposure for the performer; 16) the system may use/sell the data collected to music labels to help identify new up and coming bands, which may result in being signed to record labels for a recording contract. The system may charge a booking fee and/or a fee to share the data collected through the platform.

In some examples, the system can enable providers (e.g., musicians, bands) to schedule an event (e.g., book a gig or performance). A provider may provide the system with a preferable date, time and location of the event, and the system can perform a search to help the performer determine whether venues are available, and whether other providers are performing in proximity to the location and at or around the date and time provided by the provider. The system can also request the performance fee and help the provider determine potential profit from the event. The system may receive from the provider a flat fee (e.g., $500/event) or a percentage of revenue derived from the event (e.g., 10% net revenue from the event).

Systems of the disclosure provide venues (e.g., restaurants, clubs, bars, concert halls) the ability to interact with providers and requesters, in addition to various capabilities that may provide various economic benefits. In some cases, by enabling music fans to check into performances at venues, systems provided herein aid venues to maximize their return on investment. A venue may offer food or drink specials to requesters for checking into an event at the venue. A venue may check into an event.

In some embodiments, a system can aid a venue to gain clarity and greater visibility in generating a return on investment (ROI) based on their expenditures for musical performance and/or other entertainment. For instance, the system can provide third party data collected and aggregated by the system. Such data can be in the form of check-ins and other social interactions by and between users (e.g., performers, fans). The system can allow venues, promoters or other persons who intend to promote performances access to the data or metrics in the aggregate. The system can allow venues (or promoters) to search for performers that meet certain criteria based on their needs, and to use the system to enable the venues or promoters to contact and book or otherwise schedule the identified performer to perform on a given date, time and at a specified venue. An event can be scheduled for a fee agreed to by the parties, which may be advertised by the performer, suggested by the promoter or suggested by the platform by compiling data based on fees charged and/or negotiated or paid by promoters to performers based on similar data metrics (i.e., the number of followers, check-ins that other similarly situated performers have, which are connected to their profile). The system can provide venues information as to whether a performer has a following, the size of the following, or whether the following is reliable—some or all of which a venue can use in its decision to hire a performer for a given event. The system can provide an interface (e.g., GUI dashboard) that a venue can use to search by performer type, music type, number of check-ins, followers, tip volume, check-in or follower age demographic, gender, geography, or number of performances registered. A venue may also listen to the performers sample tracks and view performer photo albums, and music fan assigned star rating(s).

In an example, the system permits Venues to search for musicians based on 1) music type 2) number of followers and 3) number of check-ins, and offer to hire a given musician revealed upon the search to perform based, for example, on the musician's set fee schedule. The system may provide the musician information as to what other musicians with comparable analytics are charging. Such information may be provided by the system for a fee, or features offered to the musician as part of a subscription with the system.

In some embodiments, the system broadens the selection of entertainment providers (e.g., performers) from which a venue may search. The system can remove traditional barriers of human relationships and provides greater access for venues to performers and performers to venues.

In some embodiments, the system provides a calendar that venues (or promoters) can use to keep track of performers that are booked for a given day and time (or time period). The calendar can be provided on a GUI of an electronic device of a venue (or promoter). The calendar can be automatically populated when the venue books a performer using the system. In a GUI of the electronic device of the venue the system also provides input fields where the venue can indicate and store revenues for any given day and time (or time period), and allow the venue to use that data to compare and analyze the venue's business performance based on days of the week, performers hired, and compare period over period results.

Systems provided herein facilitate requester check-in's to events, streamline the method by which providers increase visibility and attendance, and provide venues the ability to increase profit from an event. In some cases, systems provided herein can generate profit from advertisements or by retaining an item of value (e.g., currency, credit) for facilitating a user (e.g., entertainment requester) check-in to a given event. In some embodiments, systems provided herein facilitate a requester check-in to a given event. In some cases, the system requests a first item of value to the requester in exchange for checking into an event. The item of value can be money. The system can then transfer a second item of value to the provider and/or venue at which the event is provided. The second item of value can be less than the first item of value. The system in some cases retains the difference between the first and second items of value, which may be profit for the system.

Systems provided herein can take check-in data and create a data record for a provider, and aggregate and collect data to permit a provider to view details as to requesters that are attending an event. The details can include the number of requesters that are attending an event and requester demographic information. In an example, a provider can view the number of requesters that are attending the provider's event in a given time period.

Features and functionalities of systems of the disclosure can be implemented with the aid of an application ("app") residing on a geolocation device, which device can be in communication with a system (e.g., the system 300 of FIG. 3) for enabling a user, such as an entertainment requester, to search for entertainment events. The app can be adapted to communicate with the system to submit a query for a search for an entertainment event, such as a performance, and retrieve entertainment events that meet criteria specified in the query. The app can enable a user to create a profile of the user or access other user profiles. Such profiles and information accessible by the app can reside on the electronic device of the user, which may be synchronized with the system. Alternatively, such information can reside on the system or on a plurality of systems, such as in a distributed fashion (i.e., on the "cloud").

An app can provide user-specific features and functionalities. In some examples, the app can provide features specific to venues, entertainment event providers, and entertainment event requesters. Such features can be provided by the system based on user login. For example, if a venue has logged into the system, the system can provide venue-specific features to the venue. As another example, if an entertainment event requester has logged into the system, the system can provide requester-specific features to the entertainment event requester. As another example, if an entertainment event provider has logged into the system, the system, can provide provider-specific features to the entertainment event provider.

The app can enable a user to query a geolocation of the user or query a list of event locations overlaid on map within a given distance from a select location, such as the geolocation of the user. The app can present venue data, as may be manually entered into the system or automatically retrieved through the Internet or an intranet, such as, for example, downloaded from Google with the aid of a data mining engine of the system. The app can display all performances per date and/or location preference parameters. Under list view, the app can print a list of performances and associated venues and time of performance and distance from the location of the user.

In some embodiments, an app can provide the name of a performer (or event provider), the name of a venue, the address of the venue, the performer's start rating (e.g., Yelp® rating), the venue's start rating (e.g., Yelp® rating), the performer's picture or avatar, the venue's phone number, the distance of the venue from the user's geolocation, a link or copy of a sample (or demo) of the performer, the cost of the performance, the start time and/or end time of the performance, the performer's music type, a link to the performer's profile (e.g., Facebook® profile, Google+ profile, Foursquare® profile, Linkedin® profile), a headliner or opening act of the performer. In addition, the app can enable the user to receive directions from the user's geolocation to the venue of the performer, invite other users to a given event (or performance), and check into the event or venue at which the event is located (i.e., perform a check-in).

The app can enable the user to view events in map view or list view. Under map view, the user can view events overlaid on a two dimensional or pseudo-three dimensional map. Under list view, events can be displayed to the user on a list, which may be sorted, for example, by proximity to the geolocation of the user, the type of music, the cost of the performance, the time of the performance (e.g., a given start time), or whether the performance is a present performance, future performance or past performance. Such criteria can also be used to filter search results.

The app can enable the user to check into an event. In some cases, the user is permitted to check in only if the user is adjacent to or within a given distance from the event (see above). Once the user has checked into the event, a confirmation can be displayed on the GUI of the electronic device of the user. In some cases, the user can be permitted to invite other users to the event or see a list of others users that have checked into the event.

User visibility can be subject to privacy settings selected by users, entertainment providers or venues, which may be facilitated with the aid of the app and GUI menu options that provide users, providers and venues to select privacy settings. For instance, a user may elect to have his or her profile be hidden from view by other users, or users that are not within a user group or social network of the user. As another example, an entertainment provider may elect to not enable users to communicate with one another during an event. A user that is hidden from other users may not be revealed to other users upon user check-in, and may not be communicated by such other users.

In some embodiments, the app can enable the user to invite other uses to join the system. In some cases, the invitation can be provided to other users by way of an electronic message, such as an electronic mail (email), instant message, or text message. The invitation can direct the others uses to a uniform resource locator (URL) to access the system to create a profile. The contact information of another user can be manually entered by the user, or may be retrieved from a contact database (e.g., electronic address book) of the user, as may be stored on an electronic device of the user. In some cases, the app (or system coupled to an electronic device of the user having the app) can access the user's social network (e.g., Facebook®, Twitter®, Linkedin®, Foursquare®, Google+®, Instagram®) profile or email account and retrieve the contact information of other users, which may be used to provide invitations to the other users.

In some cases, the app is adapted to post updates on a social network of the user, such as upon user check-in at a given venue or entertainment event. In an example, the app posts an update (e.g., "John has checked into the Performer's concert at the City Hotel") on a Facebook or Google+ profile of the user.

The app can provide the user a snapshot of other users attending a given entertainment event. The snapshot can be provided on the GUI of the app. The snapshot can be provided in a list view having the names of all users provided in a list, or by way of a collection of avatars or user pictures. From the snapshot the user can access a profile of another user to view the other user's profile information, which may include, without limitations, the other user's name (first, middle, last), age, sex, name of friends, followed friends, profile picture, social interests, work information, education information, entertainment event preferences, previous check-in's, favorite entertainment event providers, grabbed pictures, social network (including links to social networks), location (city, state, country), list of followers (including performers), list of following, list of recent performances attended (with performer profile picture and date of performance), option to send gift, option to send message, option to block the other user, and/or system elite status level. The snapshot may enable the user to electronically poke another user.

The app may enable the user to view information related to an entertainment provider or venue. The user can access a profile of an entertainment event provider. The profile may provide information relating to the provider, including, without limitation, performer name, star rating, reviews, number of followers, list of followers, badge level of followers per follower (which may be sorted by badge status), samples (e.g., music samples), photos (which may be sorted by date, and which may include all photos identified and uploaded while the user or performer checked in at a performance), upcoming events (or gigs), option to follow, and/or option to provide a tip.

The app can enable a user or entertainment provider to create event data, such as event date, time, name, venue, type (e.g., movie, music concert), cost, food/drink requirement, age requirement (e.g., age 21 and over), or dress requirement. The venue can be provided with the aid of a geolocation device. In some cases, the venue can be provided with the aid of a database that includes information on events, such as, for example, Google® places.

The app can be configured to enable the user to program alerts. An alert can be a location-based alert. An alert can enable the system to provide the user a notification based on one or more criteria selected by the user, such as, for example, entertainment provider, venue, and/or location. In some cases, a location-based alert enables the system to notify the user when the user is at or within an alert distance from a designated location. In other cases, the system can provide the user an alert when the user is within an alert distance of an entertainment event or a venue having the entertainment event. The alert distance in such cases can be up to about 10 miles, 5 miles, 1 mile, 0.5 miles or 0.1 miles from the designated location (e.g., music hall).

Systems and methods of the disclosure can be provided to users on a pay-as-you-go, flat fee or subscription basis. For instance, entertainment requesters may subscribe to the services offered by the system 300. The subscription can be on a monthly basis and carry a monthly service charge (e.g., $9.95/month). Entertainment providers and/or venues may also subscribe to the services offered by the system 300. Subscriptions for entertainment requesters, entertainment providers and venues may carry the same service charge (e.g., $9.95/month), or may be different depending on whether the user is a requester, a provider or venue. In addition, the services provided by the system 300 and the features available to the user may vary depending on whether the user is a requester, provider or venue. For example, a requester may be able to search for entertainment events but not sign up for an event (e.g., book a gig), whereas a provider may be able to sign up for an event (e.g., provide an event data and time, and location, such as venue).

The system may receive a fee for facilitating a given transaction. For instance, the system 300 may request a check-in fee from a requester, and provide at least a portion of that fee to a provider as part of the admissions fee to the event. The system 300 can retain a portion of the fee as part of the transaction charge. Alternatively, the transaction fee can be provided to the system by way of a subscription of the provider or venue.

Example 1

An entertainment requester has a geolocation device (e.g., Apple® iPhone) that has an application (app) coupled to a system that enables the entertainment requester to search for entertainment events in proximity to the entertainment requester. The app enables the entertainment requester to view the current location of the entertainment requester on a map. The app provides the entertainment requester with a list of entertainment events within a given search area. The list can be sorted by events that are in closest proximity to the entertainment requester. The app can present the entertainment events on a map that shows the events and, optionally, the location of the entertainment requester.

The app can permit the entertainment requester to check into the event. Upon check-in, the entertainment requester may be provided with other features and functionalities, such as a listing of other users that have checked into the event, or entertainment provider and/or venue benefits that may only be available upon check-in, such as music, food and/or drink discounts.

In a map view of the app, the entertainment requester can view providers that have checked in and are performing, as marked by red pins. Performances that are presently happening are marked by blue pins. From the map view the entertainment requester can select an event for more information about the event, such as details on the entertainment provider associated with the event or venue. The system can provide the entertainment requester with the address and name of the venue, the time of the performance, the type of music being performed, and if a fee applies (e.g., whether a ticket is required, whether there is a cover charge, or whether there is a food and drink minimum). The app can enable the entertainment requester to listen to a sample (e.g., music sample) of the event being provided at the venue.

In a list view, the app presents the entertainment requester with a description of each of the entertainment providers (e.g., musicians, bands) that are performing in a given search area. From map view, if the entertainment requester elects to attend a given event, the app can provide the entertainment requester directions to the event.

The app can be configured to provide the entertainment requester alerts on when and where select entertainment providers are performing. The app may enable the entertainment requester to elect to receive recommendations on entertainment events and entertainment providers.

Example 2

FIGS. 4-14 show screenshots of a graphical user interface (GUI) of an application (app) that is coupled to system for enabling a user (e.g., entertainment event requester) to find entertainment events. The app may be installed on a geolocation device of the user. In the illustrated examples, the geolocation device is an Apple® iPhone®. The user may be a music fan (or music lover), a performer, or a venue.

Figure 4:
FIG. 4 is a screenshot of a graphical user interface (GUI) of an application (app), in accordance with certain embodiments of the invention.

FIG. 4 is a screenshot of the app showing various features and functionalities. The images show information that is relevant to an entertainment provider ("Performer"). The user can select to view the entertainment provider's events (or shows), fans, photos and music (e.g., music samples). The shows can be filtered based on location. For instance, the user can view any shows that are in proximity to the user.

Figure 5:
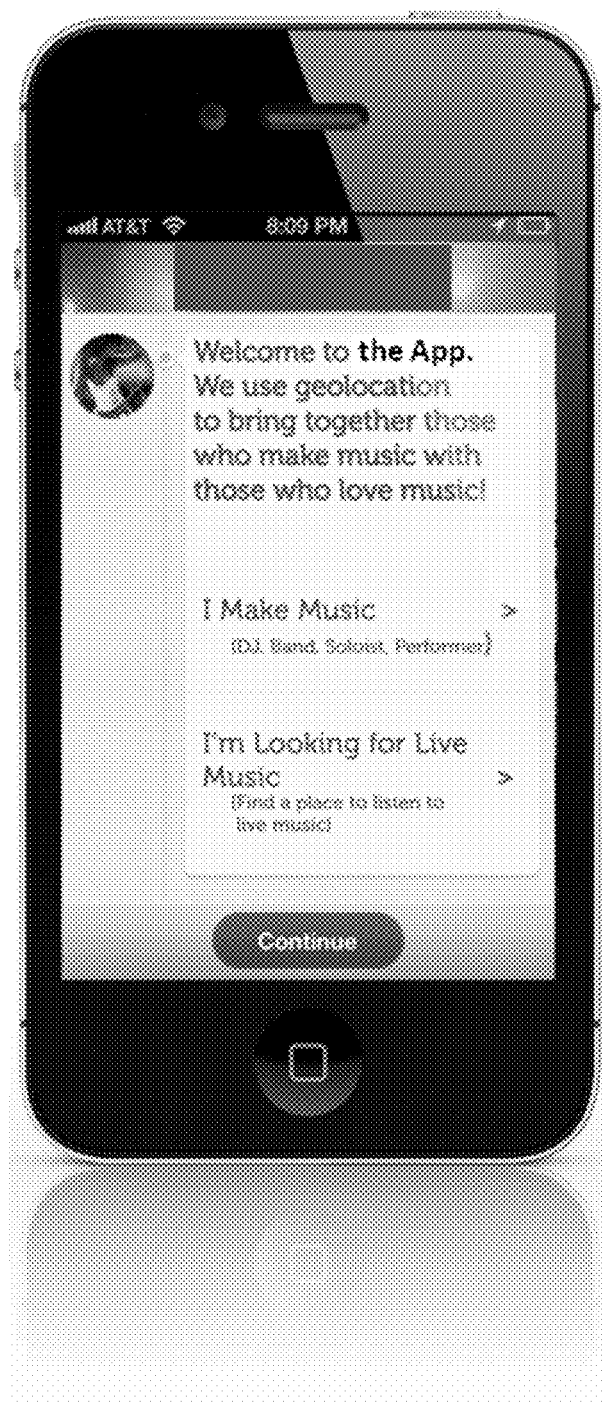
FIG. 5 shows a screenshot of a GUI having a welcome screen of the app of FIG. 4, in accordance with certain embodiments of the invention.

FIG. 5 shows a welcome screen of the GUI. The welcome screen provides features to various users, such as music fans and performers. A music fan, for instance, can select "I'm looking for Live music," and the system will provide the music fan a selection of live music performances in proximity to the music fan. As another example, a performer can select "I Make Music" to post a notification of a musical performance that the performer is going to provide. A user can make a selection and press "Continue."

Figure 6:
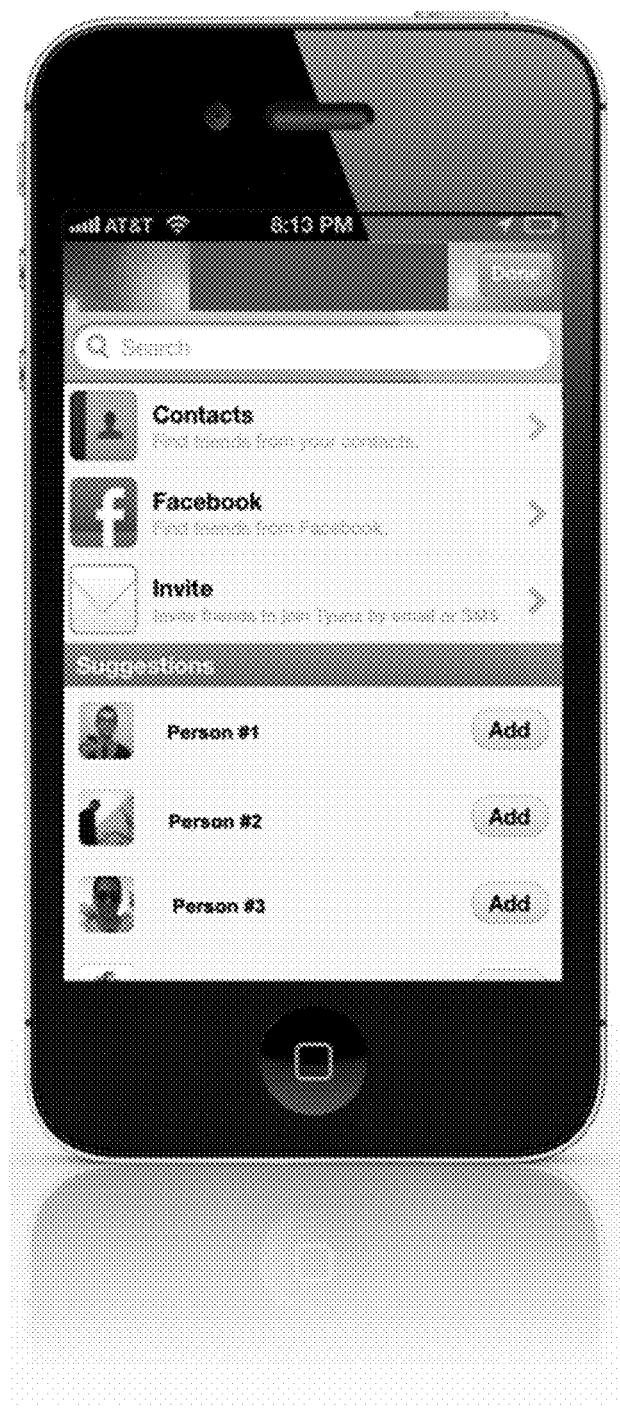
FIG. 6 shows a screenshot of a GUI having a search field, in accordance with certain embodiments of the invention.

FIG. 6 shows a screen including a Search field and features that enable a user to access the user's Contacts, Facebook (or other social network) profile, invite other users ("Invite"), and suggestions for other users to add to the user's network.

Figure 7:
FIG. 7 shows a screenshot of a GUI having the results of a search by a music fan for a local performance, in accordance with certain embodiments of the invention.

In FIG. 7, the user, which is a music fan, has conducted a search for a local performance. The system performs a search for music performances that are in proximity to the geolocation of the user, as may be determined by a geolocation device of the user and transmitted to the system. In the illustrate example, the GUI displays potential musical performances of interest to the user (e.g., "Performer A", "Performer B," "Performer C," and "Performer D") that are in proximity to the user. The GUI also displays the date and planned start and end time of each performance.

The GUI further includes various interfaces (e.g., buttons) to enable the user to access various features of the system. A Notifications button 705 permits the user to access notifications. A check in button 710 enables the user to check into an event. A People button 715 permits the user to view a listing of other users who have checked into a common event. A Gig Now button 720 enables entertainment providers a shortcut to enter the details of a event performance. When the entertainment provider uses the "gig now" button they can establish a record of the event without entering all of the information relative to the event that the entertainment provider can enter through the main entertainment event creation screen. In some cases, the "gig now" button is only displayed for accounts configured as entertainment provider accounts during the account setup process. A Map button 725 enables the user to view performance in proximity to the user in map view (see FIG. 8).

Figure 8:
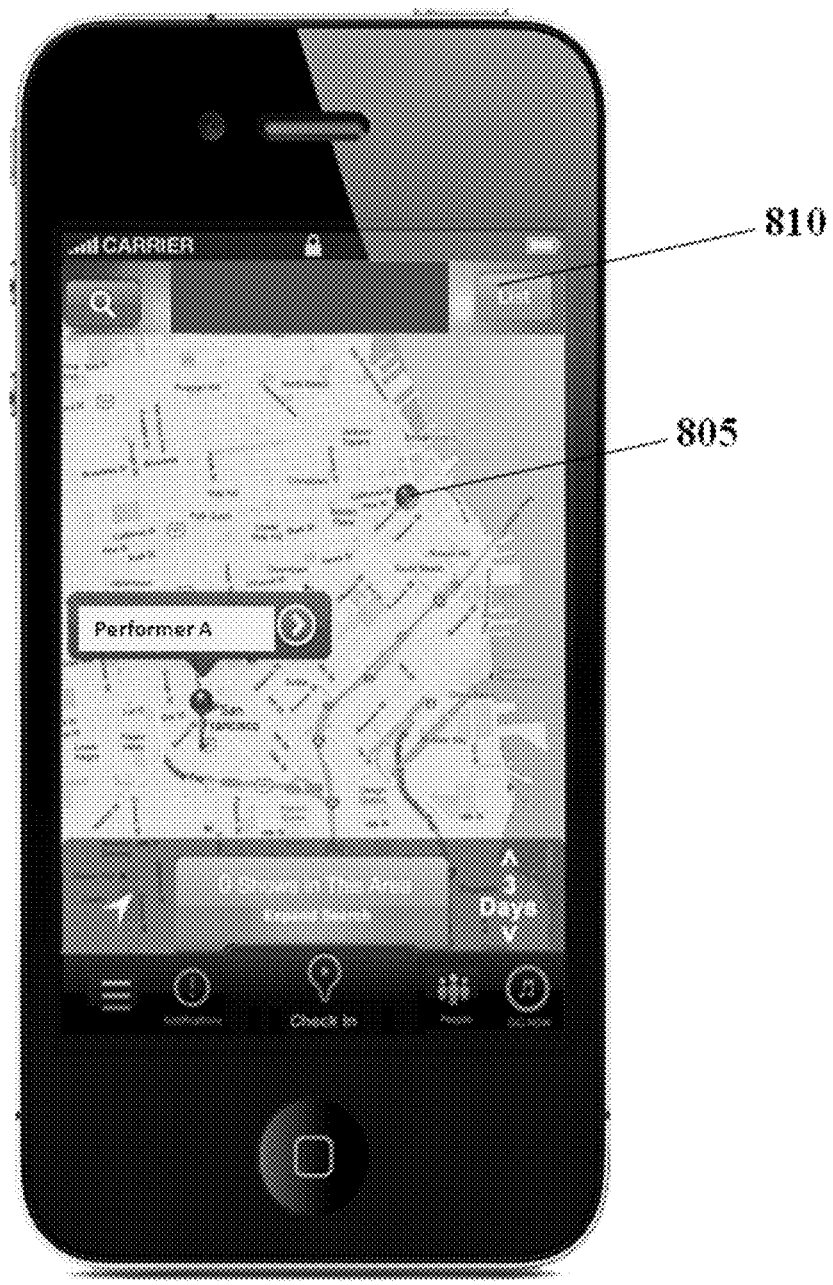
FIG. 8 is a screenshot of a GUI having a map showing performances in proximity to the user, in accordance with an embodiment of the invention.

The user can select a performance from the listing of FIG. 7 to view the location of the performance in relation to the user's geographic location on a map, as shown in FIG. 8. The location of the user 805 is marked on the map. A pin marks the location of the selected musical performance ("Like Nirvana"). The GUI can enable the user to return to the list view (FIG. 7) using a list button 810. The user can zoom in and out on the map of FIG. 8 to view other performances within various search areas.

Figure 9:
FIG. 9 shows a screenshot of a GUI in which the user has selected a performer to view details on the selected performer, in accordance with an embodiment of the invention.

With reference to FIG. 9, the user selects a performer ("Like Nirvana" in the illustrated example) from the map of FIG. 8 and to view details on the selected performer on a GUI. The details show the number of users that follow the performer, the location (or venue) and start date and time of the performance, the cost of the performance, and an opening act or performance associated with the performance. The details can further include a sample track for review by the user.

The GUI of FIG. 9 includes a Direction button 905 to enable the user to get directions to the performance from the user's location (or another location provided by the user), an Alerts button 910 to enable the user to setup or modify alerts related to the performer, an Invite button 915 that enables the user to invite other users to the performance, and a Check-in button 920 that enables the user to check into the performance or the venue of the performance ("Union Square").

Figure 10:
FIG. 10 shows a screenshot of a GUI having a listing of performers and the user having checked into a given performer ("Performer A"), in accordance with an embodiment of the invention.

With reference to FIG. 10, the user has checked into the Performer A performance. The system enables the user to check out of the performance by pressing "Check out."

Figure 11:
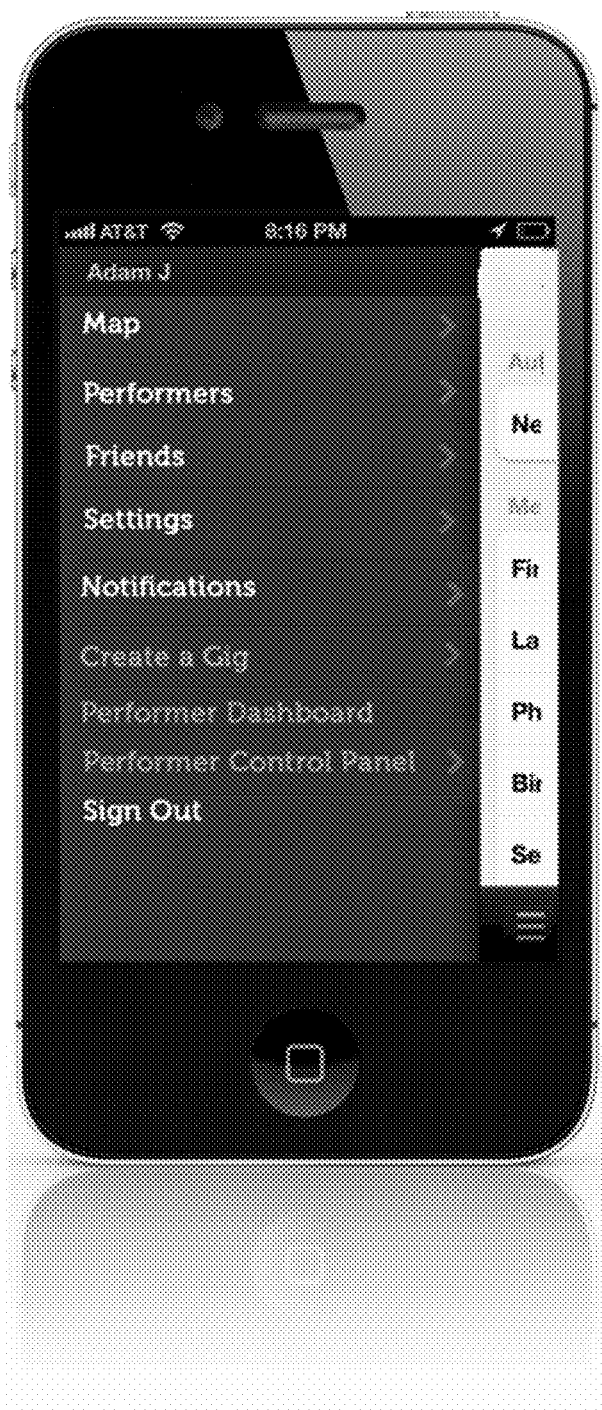
FIG. 11 shows, in list view, a screenshot of a GUI having various features of the app of FIG. 4, in accordance with an embodiment of the invention.

FIG. 11 shows, in list view, various features of the app. The user can select "Map" to view a map having various performances at a designated location, such as in proximity to the user. The user can select "Performers" to view one or more performers at the designated location. Under "Friends," the user can view profile pages of the user's friends. The user may view friends that are at the designated location. Under "Settings," the user can set or modify various settings of the system. "Notification" can enable the user to set alerts or notifications, such as an alert indicating that the user is within a select distance from a performer of interest to the user.

Figure 12:
FIG. 12 shows a screenshot of a GUI having various other users that have checked into a given event, in accordance with an embodiment of the invention.

FIG. 12 shows various other users that have checked into a given event. The user can scroll through the avatars 1201 of the other users and select a particular avatar to view more information about that user. In some cases, the user can view the avatars of users that may not be at the event, and invite one or more of the other users to the event.

Figure 13:
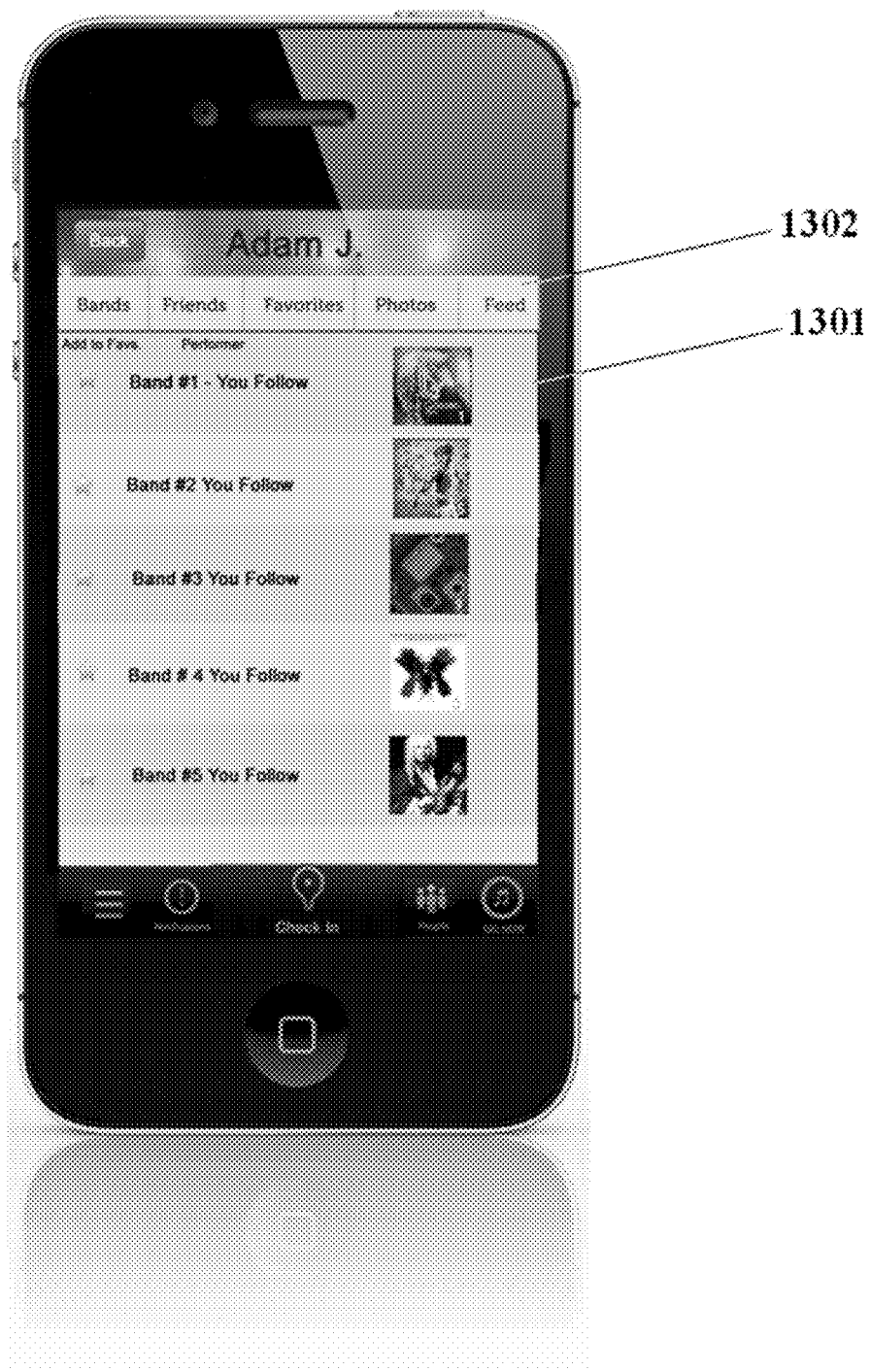
FIG. 13 shows a screenshot of a GUI having a listing of performers that are being followed by a user, in accordance with an embodiment of the invention.

FIG. 13 shows a listing 1301 of performers (or bands) that that are being followed by the user. A menu bar 1302 at the top of the screen allows the user to access various features of the app, such as a listing of bands ("Bands"), listing of the user's friends ("Friends"), favorite performers of the user ("Favorites"), photos captured by the user at various events ("Photos"), and a an activity feed ("Feed"). The activity feed can provide details as to various activities, such as, for example, when another user (e.g., a friend of the user) that is being followed by the user follows a performer, checks into an event (e.g., musical performance), checks out of an event, likes or dislikes an event, rates an event, provides a tip to an entertainment event provider (e.g., performer), sends the user a message, earns a badge, and/or achieves an elite status. The elite statue can be achieved upon a user meeting certain criteria specified by the system or, alternatively, a venue or entertainment event provider.

Figure 14A:
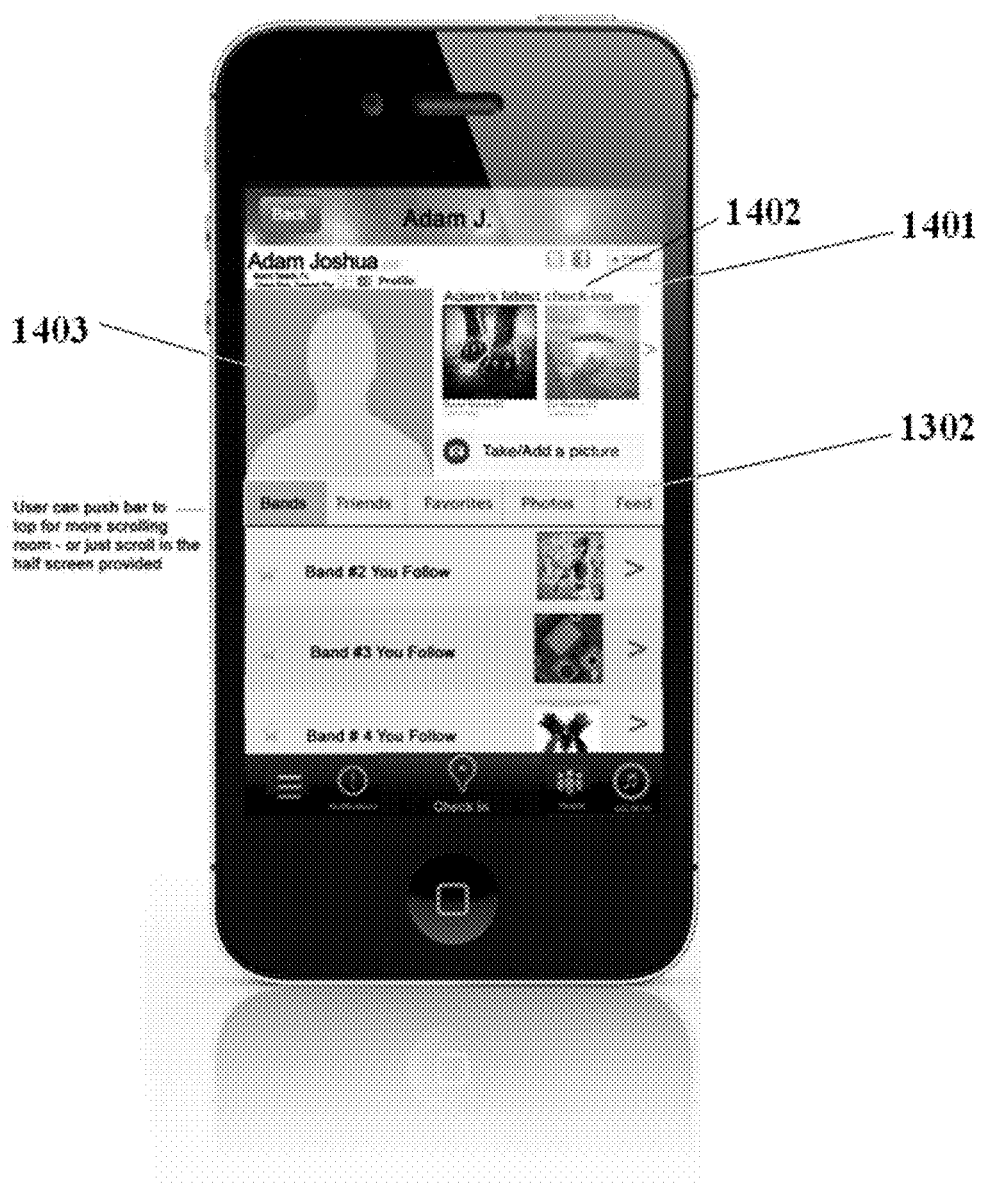
FIGS. 14A and 14B show screenshots of a GUI of a profile page of a user, in accordance with an embodiment of the invention.

FIG. 14A shows a profile 1401 of the user, which shows the user's latest check-in's 1402, the user's avatar (or profile picture) 1403, and other identifying information of the user, such as a description ("About Me", see FIG. 14B) of the user. The menu bar 1302 of FIG. 13 appears below the profile 1401. The user can push the menu bar 1302 up or down to adjust the space that the user has to view the profile 1401. The menu (or tab) bar 1302 can slide up to the top of the screen so that scrolling can be readily achieved by the user.

Figure 14B:
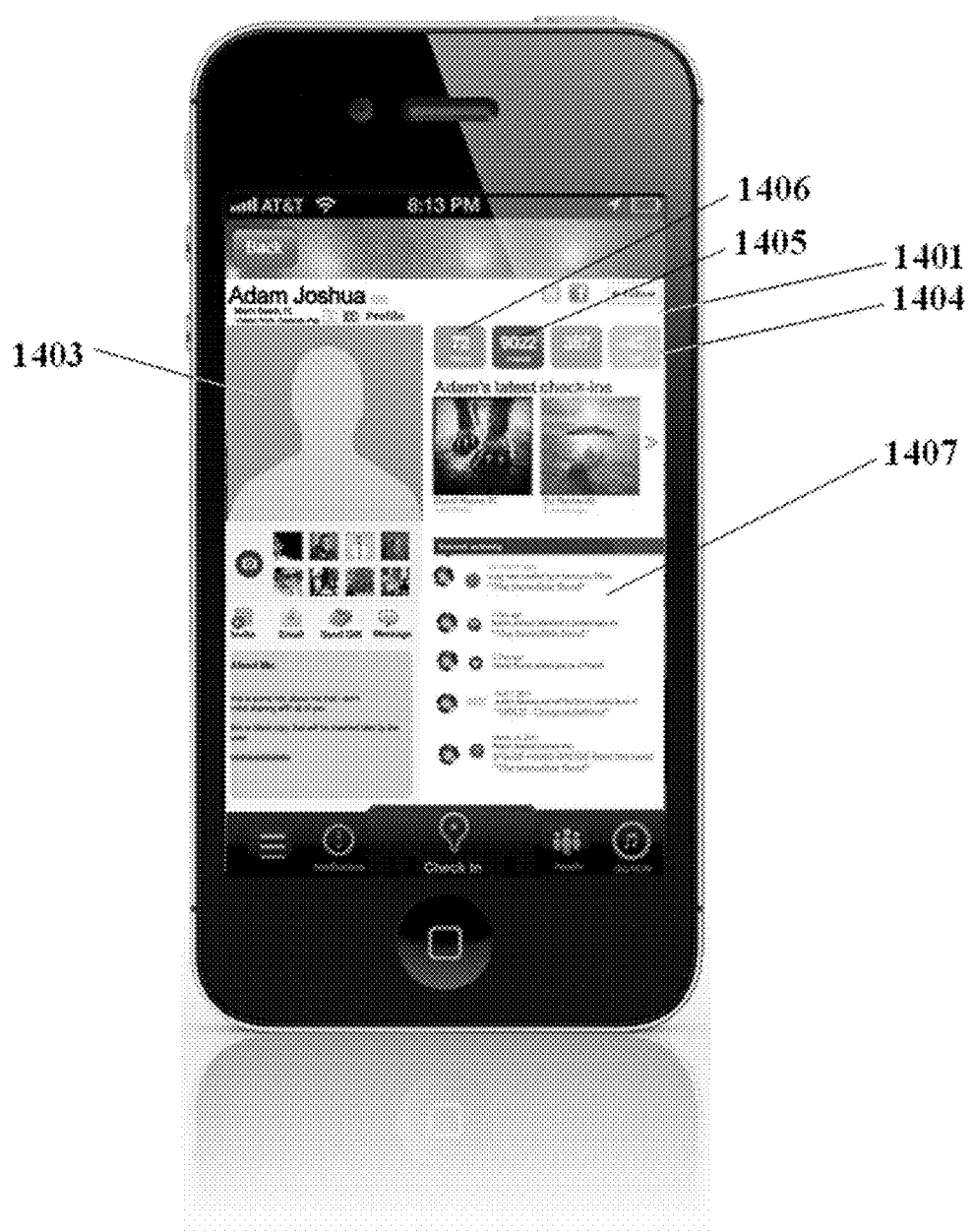

FIG. 14B shows the profile 1401 of the user in greater detail. The user has "pushed" the menu bar 1302 to the bottom and out of view. The user's profile 1401 includes the user's avatar 1403, the total amount 1404 of money that the user has provided in tips, the user's total number of friends 1405 on the system, and the total number of bands 1406 followed by the user. The profile 1401 also displays the user's latest activity 1407, which may include latest check-ins or performers (or bands) that the user has added to the user's list of bands to follow.

The profile 1401 may be accessible by other users. Another user, for instance, may access the profile and view the user's information. The other user may be provided access to certain information, depending on privacy settings selected by the user having the profile 1401. The other user may invite the user of the profile 1401 to an event (e.g., performance), email the user, send a gift to the user, or send a message (e.g., IM) to the user.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents. It is intended that the following claims define the scope of the invention and that methods and structures within the scope of these claims and their equivalents be covered thereby.

What is claimed is:

1. A computer-implemented method for presenting an entertainment requester with a selection of entertainment events within a mobile application that presents the entertainment requestor with the selection of entertainment events, comprising:

(a) determining a geographic location of said entertainment requester;

(b) conducting, with the aid of a processor, a search for at least one entertainment event that is occurring at a physical venue within a search area encompassing in whole or in part said geographic location of said entertainment requester determined in (a);

(c) displaying, within the same mobile application on a graphical user interface (GUI) of an electronic device of said entertainment requester, a geographic location of one or more entertainment events revealed upon said search in (b), wherein an entertainment event has at least one performer and comprises at least one of a comedic performance, theatrical performance, and musical performance, and wherein the one or more entertainment events revealed upon said search in (b) are available for said entertainment requester to check-in, within the same mobile application that displays the one or more entertainment events, during the performance of the one or more entertainment events when the entertainment requestor is within a threshold geographic distance of the physical venue;

(d) receiving a request to check-in to a performer of an entertainment event of the one or more entertainment events, wherein checking-in comprises connecting the performer of the entertainment event to the entertainment requester, and wherein checking-in is independent of a particular venue associated with the entertainment event;

(e) determining popularity of the performer based at least on the check-in by the entertainment requester to the performer; and (f) ranking the entertainment requester as a fan of the performer by ranking the entertainment requester based on at least one of the check-in by the entertainment requester, gratuities paid, and merchandise purchased.

2. The method of claim 1, wherein (b) comprises generating a list of entertainment events from said search.

3. The method of claim 1, wherein said search area includes a search radius.

4. The method of claim 1, wherein said search area is selected by said entertainment requester.

5. The method of claim 1, wherein said GUI comprises a map.

6. The method of claim 1, wherein said at least one entertainment event is a music event.

7. The method of claim 1, further comprising displaying, on said GUI, identifying information associated with one or more other entertainment requesters, wherein said one or more other entertainment requesters are located at an entertainment event selected from said one or more entertainment events displayed on said GUI in (c).

8. The method of claim 1, wherein said geographic location of said entertainment requester is determined with the aid of the electronic device of said entertainment requester.

9. The method of claim 1, wherein, prior to (a), receiving a request from said entertainment requester for one or more entertainment events at or in proximity to said geographic location of said entertainment requester.

10. A computer-implemented method for directing advertising to an entertainment requester, comprising:
(a) determining a geographic location of said entertainment requester;
(b) conducting, with the aid of a processor, a search for at least one entertainment event that is occurring at a physical venue within a search area encompassing in whole or in part said geographic location;
(c) displaying, within a mobile application on a graphical user interface (GUI) of an electronic device of said entertainment requester, a geographic location of one or more entertainment events revealed upon said search in (b), wherein the one or more entertainment events revealed upon said search in (b) are available for said entertainment requester to check-in, within the same mobile application that displays one or more entertainment events, during the performance of the one or more entertainment events when the entertainment requestor is within a threshold geographic distance of the physical venue, wherein an entertainment event has at least one performer and comprises at least one of a live comedic performance, a live theatrical performance, and a live musical performance, and wherein the one or more entertainment events revealed upon said search in (b) are available for said entertainment requester to check-in during the performance of the one or more entertainment events when the entertainment requestor is at the physical venue;
(d) receiving a request to check-in to a performer of an entertainment event of the one or more entertainment events, wherein checking-in comprises connecting the performer of the entertainment event to the entertainment requester, and wherein checking-in is independent of a particular venue associated with the entertainment event;
(e) displaying an advertisement on said GUI;
(f) determining popularity of the performer based at least on the check-in by the entertainment requester to the performer; and
(g) ranking the entertainment requester as a fan of the performer by ranking the entertainment requester based on at least one of the check-in by the entertainment requester, gratuities paid, and merchandise purchased.

11. The method of claim 10, wherein, upon receiving said request to check-in to said entertainment event (d), determining that said entertainment event has not ended and, upon determining that said entertainment event has not ended, checking said entertainment requester into said entertainment event.

12. The method of claim 10, wherein, in (e), said advertisement is displayed on said GUI upon checking said entertainment requester into said entertainment event.

13. The method of claim 10, wherein said advertisement is selected in view of (i) the type of entertainment event of said entertainment event, (ii) the proximity of said entertainment requester to an entertainment event among said one or more entertainment events, (iii) the proximity of said entertainment requester to a venue of said entertainment event, and/or (iv) one or more preferences of said user.

14. A computer readable medium comprising code that, when executed by one or more computer processors, implements a method, the method comprising:
(a) determining a geographic location of said entertainment requester;
(b) conducting, with the aid of a processor, a search for at least one entertainment event that is in progress at a physical venue within a search area encompassing in whole or in part said geographic location of said entertainment requester determined in (a);
(c) displaying, within a mobile application on a graphical user interface (GUI) of an electronic device of said entertainment requester, a geographic location of one or more entertainment events revealed upon said search in (b), wherein an entertainment event has at least one performer and comprises at least one of a live comedic performance, a live theatrical performance, and a live musical performance, and wherein the one or more entertainment events revealed upon said search in (b) are available for said entertainment requester to check-in, within the same mobile application that displays the one or more entertainment events, during the performance of the one or more entertainment events when the entertainment requestor is within a threshold geographic distance of the physical venue;
(d) receiving a request to check-in to a performer of an entertainment event of the one or more entertainment events, wherein checking-in comprises connecting the performer of the entertainment event to the entertainment requester, and wherein checking-in is independent of a particular venue associated with the entertainment event;
(e) determining popularity of the performer based at least on the check-in by the entertainment requester to the performer; and
(f) ranking the entertainment requester as a fan of the performer by ranking the entertainment requester based on at least one of the check-in by the entertainment requester, gratuities paid, and merchandise purchased.

15. The computer readable medium of claim 14, wherein (b) comprises generating a list of entertainment events from said search.

16. The computer readable medium of claim 14, wherein said search area includes a search radius.

17. The computer readable medium of claim 14, wherein said search area is selected by said entertainment requester.

18. The computer readable medium of claim 14, wherein said GUI comprises a map.

19. The computer readable medium of claim 14, wherein said at least one entertainment event is a music event.

20. The computer readable medium of claim 14, further comprising displaying, on said GUI, identifying information associated with one or more other entertainment requesters, wherein said one or more other entertainment requesters are located at an entertainment event selected from said one or more entertainment events displayed on said GUI in (c).

21. The computer readable medium of claim 14, wherein said geographic location of said entertainment requester is determined with the aid of the electronic device of said entertainment requester.

22. The computer readable medium of claim 14, wherein, prior to (a), receiving a request from said entertainment requester for one or more entertainment events at or in proximity to said geographic location of said entertainment requester.

* * * * *